Nov. 15, 1955     E. E. ESPITALLIER     2,723,453
TRIMMER FOR LAWN SPRINKLER HEADS
Filed Aug. 14, 1953
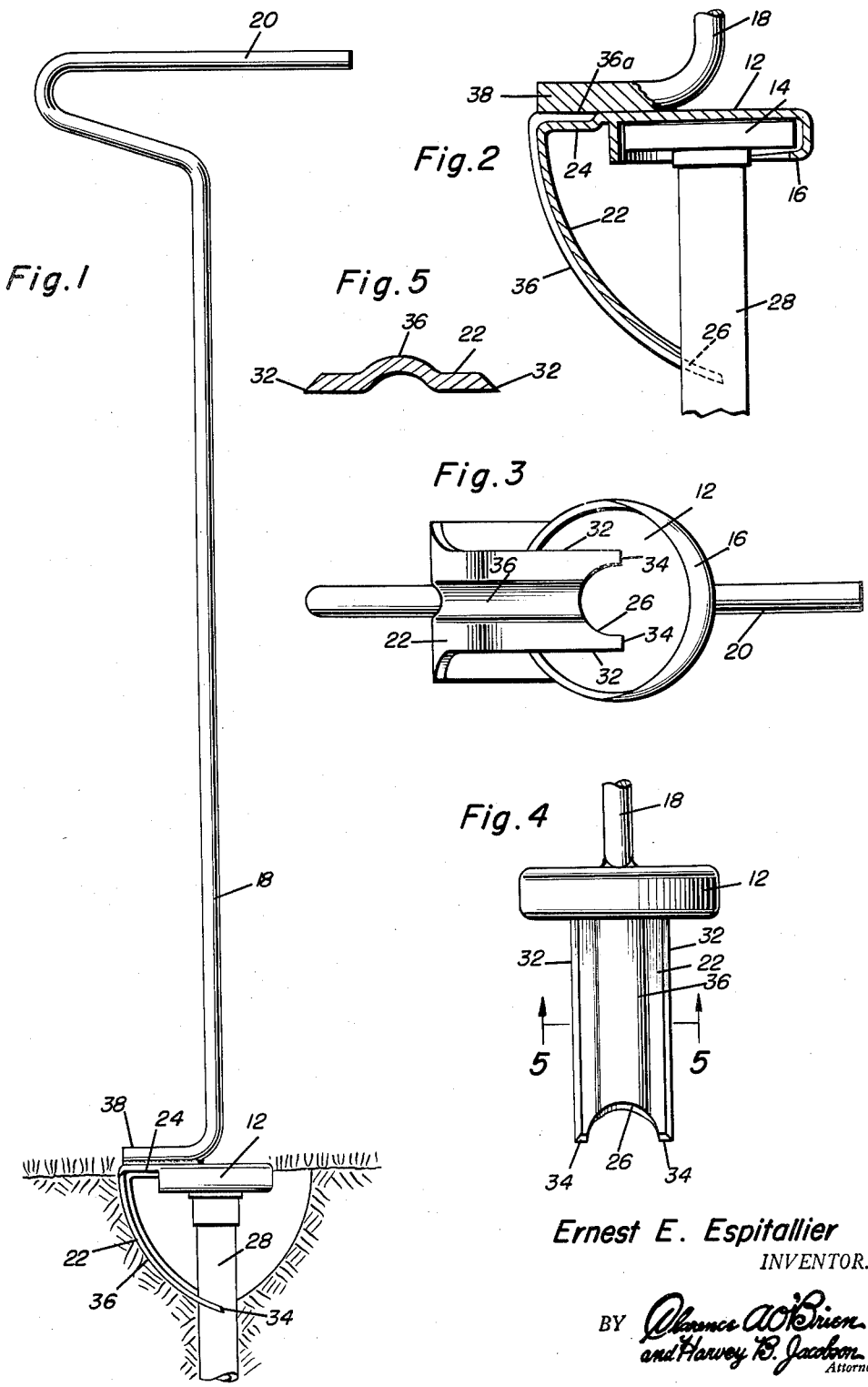
Ernest E. Espitallier
INVENTOR.

United States Patent Office 2,723,453
Patented Nov. 15, 1955

2,723,453

TRIMMER FOR LAWN SPRINKLER HEADS

Ernest E. Espitallier, South Gate, Calif.

Application August 14, 1953, Serial No. 374,216

1 Claim. (Cl. 30—310)

This invention relates to new and useful improvements and structural refinements in lawn trimmers, and the principal object of the invention is to facilitate convenient and expeditious trimming of grass in the vicinity of lawn sprinkler heads.

The above object is achieved by the provision of a trimmer which includes a socket adapted to rotatably receive a sprinkler head therein, so that when the device is applied to the sprinkler head and is rotated about the same, the surrounding area of the lawn may be efficiently trimmed.

Some of the advantages of the invention reside in its simplicity of construction, in its efficient and dependable operation, and in its adaptability to economical manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the invention in use;

Figure 2 is a fragmentary, vertical, sectional detail thereof;

Figure 3 is an under side plan view of the invention per se;

Figure 4 is a fragmentary, elevational view thereof; and

Figure 5 is a sectional detail taken substantially in the plane of the line 5—5 in Figure 4.

Referring now to the accompanying drawings in detail, the trimmer embodies in its construction a substantially circular, hollow socket 12 which is adapted to be rotatably positioned on a conventional lawn sprinkler head 14.

The socket 12 is preferably provided at one side at the bottom thereof with a segment-shaped keeper flange 16 so as to prevent the socket from being dislodged from the sprinkler head while it is being rotated thereon.

A suitable, upwardly extending handle 18 is secured at its lower end to the socket 12 and terminates at the upper end in a hand piece or grip 20, while an arcuate cutter blade 22 is formed integrally with a lateral extension 24 on the socket 12 as shown.

The blade 22 extends downwardly and inwardly from the extension 24 of the socket 12 and is provided in its lower end portion with a substantially semi-circular keeper notch or recess 26 to rotatably engage a supply pipe 28 leading to the sprinkler head 14 as is clearly shown in Figures 1 and 2.

In this manner the cutter blade 22 is supported in a proper, concentric alignment with the sprinkler head 14 while the trimming operation is in progress.

The blade 22 is provided at the sides thereof with sharp cutting edges 32 and is also provided at the lower end thereof with sharp cutting edges 34, the latter being disposed at the opposite sides of the notch or recess 26.

For the purpose of reinforcement, the intermediate portion of the blade 22 may be formed with an integral, convexo-concave rib 36, which may be continued along the aforementioned extension 24, as indicated at 36 A in Figure 2. For purposes of additional rigidity, the lower end portion 38 of the handle 18 may be laterally angulated as illustrated and secured by welding, or the like, to the rib extension 36 A as well as to the socket 12.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A lawn trimmer comprising a socket for receiving and rotatably seating on a lawn sprinkler head, an upstanding handle on the socket for rotating the same, and a cutter blade secured to the socket for rotation thereby and extending downwardly therefrom for rotatably engaging a vertical sprinkler pipe on which a sprinkler head is mounted, said blade curving downwardly and inwardly from said socket for engagement with a sprinkler pipe and being provided with a notched lower end for engaging and straddling a sprinkler pipe.

References Cited in the file of this patent

UNITED STATES PATENTS

| | | |
|---|---|---|
| 1,182,629 | Birnbaum | May 9, 1916 |
| 1,765,288 | Schmidt | June 17, 1930 |
| 1,791,957 | Cummings | Feb. 10, 1931 |
| 2,691,823 | Dombrowski | Oct. 19, 1954 |